United States Patent
Takeda et al.

(10) Patent No.: US 6,319,613 B1
(45) Date of Patent: Nov. 20, 2001

(54) COATING SOLUTION FOR FORMING A FILM FOR CUTTING OFF SOLAR RADIATION AND THE FILM FORMED THEREFROM

(75) Inventors: Hiromitsu Takeda, Ichikawa; Kayo Yabuki, Tokyo; Kenji Adachi, Inzai, all of (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 09/457,677

(22) Filed: Dec. 9, 1999

(30) Foreign Application Priority Data

Dec. 10, 1998 (JP) .................................. 10-351212

(51) Int. Cl.[7] ..................................... B32B 27/36
(52) U.S. Cl. .............................................. 428/412
(58) Field of Search ................................ 428/412

(56) References Cited

U.S. PATENT DOCUMENTS

6,221,945   4/2001   Kuno et al. ........................... 524/40

*Primary Examiner*—Terressa M. Boykin
(74) *Attorney, Agent, or Firm*—Dykema Gossett PLLC (57) ABSTRACT

A solution for forming a film having a high transmittance and a low reflectivity for visible light, a low transmittance for near infrared radiation, and a surface resistivity of at least $10^6$ ohms/square. It contains fine particles of a hexaboride of Y, La, Ce, Pr, Nd, Sm, Eu, Gd, Th, Dy, Ho, Er, Tm, Yb, Lu, Sr or Ca, and fine particles of ITO or ATO in a weight ratio of from 0.1:99.9 to 90:10. Also disclosed is a film formed on at least one side of a resin film as a base, for cutting off solar heat radiation.

12 Claims, 4 Drawing Sheets

COATING SOLUTION FOR FORMING A FILM FOR CUTTING OFF SOLAR RADIATION AND THE FILM FORMED THEREFROM

BACKGROUND OF THE INVENTION

1. Field of the Invention

This invention relates to a coating solution for forming a film for cutting off solar heat radiation on a sheet of glass or a transparent resin, or other material forming a window of a vehicle, building, office or house, a shopwindow, a lamp, etc., and the film formed therefrom.

2. Description of the Prior Art

It has hitherto been usual to employ an inorganic material or resin reflecting visible light and infrared radiation for forming a film for eliminating or reducing the generating range of solar radiation heat. Typical examples of the inorganic materials which have been employed are a metal oxide, such as $FeO_x$, $CoO_x$, $CrO_x$, or $TiO_x$, and a metal having a large quantity of free elections, such as Ag, Au or Al. A typical resin film has been formed from a mixture prepared by adding an organic agent for cutting off near infrared radiation to a resinous binder, and phthalocyanines and metal complexes are known as typical examples of agents for absorbing near infrared radiation.

The known inorganic materials have, however, the property of reflecting or absorbing visible light along with the near infrared radiation which is an important source of solar heat, and are likely to form a surface glittering like a mirror detracting from its appearance, or a surface having an undesirably low transmittance of visible light. When any such inorganic material is used to form a film covering a transparent material on a house, building, or vehicle, it is necessary to ensure that the film be so small in thickness as to be capable of transmitting visible light satisfactorily. It has been necessary to form a film having a very small thickness on the order of 10 nm by using a physical coating method, such as spraying and baking, CVD, sputtering or vacuum vapor deposition. It has been necessary to use a large apparatus, or vacuum equipment resulting in a high film cost which is undesirable from a productivity standpoint, or for the formation of a film covering a large surface. Moreover, the inorganic materials have often tended to make a film of high electrical conductivity which reflects radio waves to be received by e.g. a portable telephone, a television receiver or a car navigation system having an aerial installed within a vehicle, or causes jamming in a neighboring area.

The known organic agents have been fatally low in weatherability because of heavy deterioration by heat or humidity. Moreover, a film having a high transmittance of visible light has little power to cut off heat radiation, while a film having high power to cut off heat radiation has only a low transmittance of visible light.

Antimony-containing tin oxide (hereinafter referred to as ATO) and tin-containing indium oxide (hereinafter referred to as ITO) are known as materials having relatively low absorption or reflection of visible light and high transparency to the human eye, but as they have only low power to cut off solar radiation per unit mass, a film which can cut off heat radiation effectively has had to be prepared from a large amount of material, and has, therefore, been very expensive. Moreover, ATO has been unsatisfactory, as its free electron concentration is too low to enable any satisfactory cutoff of near infrared radiation. A film formed by a physical coating method has been so high in electrical conductivity as to reflect or interfere with radio waves.

SUMMARY OF THE INVENTION

Under these circumstances, it is an object of this invention to provide a coating solution which makes it possible to form an improved film for cutting off heat radiation easily and at a low cost.

It is another object of this invention to provide a film having a high transmittance of visible light, a low reflectivity of radio waves, a low transmittance of near infrared radiation and a high surface resistivity.

We, the inventors of this invention, have found that the use of ultrafine particles of hexaborides having a large quantity of free electrons with ultrafine particles of ATO or ITO makes it possible to form a film having its maximum transmittance of light in the visible range and its minimum transmittance in the near infrared range.

According to a first aspect of this invention, therefore, there is provided a coating solution containing fine particles of at least one kind of hexaboride represented as $XB_6$, in which X is Y, La, Ce, Pr, Nd, Sm, Eu, Gd, Tb, Dy, Ho, Er, Tm, Yb, Lu, Sr or Ca, and fine particles of ITO or ATO in a weight ratio of from 0.1:99.9 to 90:10.

The solution may further contain fine particles of at least one kind of additional oxide selected from the group consisting of $SiO_2$, $TiO_2$, $ZrO_2$, $Al_2O_3$ and MgO.

The solution contains at least one kind of resin selected from the group consisting of ultraviolet-curing, electron beam-curing, cold-curing and thermoplastic resins as a binder.

The fine particles of the hexaboride and ITO or ATO may have a diameter not exceeding 200 nm.

The fine particles of the additional oxide may be in the colloidal state in which they have a diameter not exceeding 200 nm.

According to a second aspect of this invention, there is provided a film formed on at least one side of a base for cutting off heat radiation by applying thereto a coating solution containing fine particles of at least one kind of hexaboride represented as $XB_6$, in which X is Y, La, Ce, Pr, Nd, Sm, Eu, Gd, Tb, Dy, Ho, Er, Tm, Yb, Lu, Sr or Ca, and fine particles of ITO or ATO in a weight ratio of from 0.1:99.9 to 90:10.

The base may be a film of a polycarbonate resin, a polyacrylate or polymethacrylate resin, a saturated polyester resin or a cyclic olefin resin.

The base may carry an adhesive layer and a release film on one side thereof. The base may also carry a hard coat layer on at least one side thereof as its outermost layer. The hard coat layer may be formed by a solution containing an ultraviolet-curing resin as a binder. The ultraviolet-curing resin may have its principal constituent combined chemically with at least one kind of inorganic substance selected from the group consisting of $SiO_2$, $TiO_2$, $ZrO_2$, $Al_2O_3$ and MgO.

The solution applied to the base may further contain fine particles of at least one kind of additional oxide selected from the group consisting of $SiO_2$, $TiO_2$, $ZrO_2$, $Al_2O_3$ and MgO.

The film may have a surface resistivity not lower than $10^6$ ohms per square.

The film of this invention can cut off solar radiation or its heat energy more effectively than any film formed by using only one of the following: hexaboride, ATO or ITO. The use of the hexaboride makes it possible to reduce the amount of ATO or ITO which is required, and thereby form the film at a lower cost. The film is easy to form, formed simply by coating the base with the solution of this invention without relying upon any physical coating method. The film can be formed on, for example, the windowpanes of a building to reduce the necessity for airconditioning in summer, and is, thus, of great use for energy saving and environmental purposes.

DETAILED DESCRIPTION OF THE INVENTION

The coating solution of this invention contains fine particles of a hexaboride selected from among $YB_6$, $LaB_6$, $CeB_6$, $PrB_6$, $NdB_6$, $SmB_6$, $EuB_6$, $GdB_6$, $TbB_6$, $DyB_6$, $HoB_6$, $ErB_6$, $TmB_6$, $YbB_6$, $LuB_6$, $SrB_6$ and $CaB_6$. These particles have, for example, a dark bluish violet, or green color, and if their diameters are sufficiently small as compared with the wavelength of visible light, a film in which they are dispersed transmits visible light. On the other hand, it cuts off infrared radiation, apparently because those materials have a large quantity of free electrons, and absorb near-infrared radiation owing to an interband transition between 4f and 5d, and an electron-electron, or electron-photon interaction.

Our experiments teach that the films in which fine hexaboride particles are dispersed have a maximum transmittance at a wavelength between 400 and 700 nm and a minimum transmittance at a wavelength between 700 and 1800 nm. In view of the fact that visible light has a wavelength of 380 to 780 nm and a visibility expressed by a curve having a peak in the vicinity of 550 nm, those films transmit visible light effectively and absorb or reflect any other solar radiation effectively.

The coating solution of this invention contains also fine particles of ITO or ATO. These particles transmit most of the visible light, but greatly reflect or absorb a wavelength of 1000 nm or longer owing to the plasmon resonance of free electrons. They have lower transmittance at longer wavelengths in the near infrared region.

On the other hand, the hexaborides have a minimum transmittance in the vicinity of 1000 nm and a gradually increasing transmittance for a longer wavelength. Thus, the use of hexaboride with ITO or ATO makes it possible to cut off near infrared radiation, while transmitting visible light effectively, thereby achieving a better cutoff of solar radiation than when each such substance is used alone.

The hexaboride has such high power to cut off heat radiation per unit weight that its use is effective in an amount not greater than one-tenth of the amount required of ITO or ATO. Its use with ITO or ATO makes it possible to form at a lower cost a film having a still better property of cutting off heat radiation, while retaining a satisfactorily high transmittance of visible light. It is also possible to reduce greatly the total amount of particles, including ITO or ATO, required for forming a film, and thereby form a film of improved wear resistance and weatherability.

The hexaboride absorbs visible light if its amount is increased. Therefore, if its amount is appropriately varied, it is possible to form a film absorbing visible light as required for controlling the brightness of the space behind it, or protecting the privacy of anybody in that space.

The fine particles of hexaboride have a diameter not exceeding 200 nm, and preferably not exceeding 100 nm. Particles having a diameter exceeding 200 nm have a high tendency to cohere and undergo sedimentation in their dispersion, and they, or coarse particles formed by their cohesion form a hazy film, as they scatter light. The fine particles of ITO or ATO likewise have a diameter not exceeding 200 nm, and preferably not exceeding 100 nm.

The solution may further contain fine particles of $SiO_2$, $TiO_2$, $ZrO_2$, $Al_2O_3$ or $MgO$, or a mixture thereof. These particles likewise have a diameter not exceeding 200 nm, and preferably not exceeding 100 nm, and may be used in the form of a colloidal solution prepared by a wet process.

Any method can be employed for dispersing the fine particles if it can make a solution in which they are uniformly dispersed. It is possible to employ, for example, a beads, ball or sand mill, or an ultrasonic dispenser.

The solution further contains a binder, and may more specifically contain an organic binder, such as an ultraviolet-curing, electron beam-curing, or cold-curing resin, or a thermoplastic resin, or an organic-inorganic hybrid binder prepared by modifying an organic binder with an oxide of an inorganic substance, such as silicon, zirconium, titanium or aluminum. The binder may be mixed with a dispersion of the fine particles, or directly with those particles to form the solution.

The base to which the solution is applicable may, for example, be a sheet of glass, or a sheet or film of a transparent resin. A polyethylene terephthalate (PET) film is a typical transparent resin film which can be used as the base, though a film of any other resin may be suitable for certain purposes. The resin which is usually suitable as a film for the base is a colorless and transparent one not substantially scattering light, but transmitting it, for example, a polycarbonate, polyacrylate or polymethacrylate, cyclic olefin, saturated polyester, polystyrene, or polyvinyl chloride or acetate resin.

The resin film as the base preferably has its surface treated adequately for improving its adhesion to the resin used as the binder. Its surface treatment may be performed by employing, for example, a corona discharge, a plasma, or a flame, or coating with a primer layer. If the decorative property of the base is of importance, it is possible to use a colored, or patterned resin film. It is alternatively effective to add an appropriate pigment, or dye to the solution.

The resin film used as the base may carry an adhesive layer and a release film on one side thereof, so that it can be stuck to e.g. a glass surface. The base film intended for application onto a curved surface, as of the rear windowpane of an automobile, is preferably of the type which can be softened easily by the hot air supplied by a dryer. An agent for cutting off ultraviolet radiation is preferably added to the adhesive for protecting the base film or coating from degradation by ultraviolet radiation. It is possible to add, for example, $CeO_2$, $TiO_2$, ZnO, or a benzophenone or benzotriazole type agent for absorbing ultraviolet radiation.

In the event that an ultraviolet-curing resin is used as the binder, it is beneficial to use composition consisting mainly of a mixture of a photopolymerizable oligomer, such as an epoxy, urethane-, polyester-, or polyether- acrylate, and a photopolymerizable monomer, such as a monofunctional or polyfunctional acrylate, and further containing a photoinitiator, such as benzoin, acetophenone, thioxanthone or peroxide, and a photoinitiation assistant, such as amine or quinone. It may further contain a thermopolymerization inhibitor, an adhesive or thixotropic agent, a plasticizer, an inert polymer, or a coloring agent.

The addition of fine particles of $SiO_2$, $TiO_2$, $ZrO_2$, $Al_2O_3$ or MgO to the ultraviolet-curing resin makes it possible to obtain a film of still higher strength. Similar results can be obtained if the ultraviolet-curing resin has its principal constituent combined chemically with $SiO_2$, $TiO_2$, $ZrO_2$, $Al_2O_3$ or MgO. The use of the ultraviolet-curing resin, which has excellent properties including wear resistance, makes it possible to form a resin film, or base, having a hard coat layer as well as the property of cutting off heat radiation.

The solution containing a cold-curing resin as the binder can advantageously be used to coat windowpanes of an existing house, building, vehicle, etc., and allow the resin to cure.

Any dispersant can be used to disperse the fine particles, and its selection depends on, among others, the conditions or environment in which the solution is used, and the synthetic resin which it contains as the binder. It is possible to use, for example, water, or an organic solvent such as alcohol, ether, ester or ketone. If the particles are dispersed directly into the binder, it is possible to obtain a solventless solution which is friendly to the environment.

An acid, or alkali may be added to the solution to adjust its pH as required. A surface active agent, or a coupling agent may be added to the solution to improve the stability of the fine particles dispersed therein to a further extent. The amount of each such additive should preferably not exceed 50% by weight of the particles.

The electrical conductivity of a film is brought about by the mutual contact of fine particles dispersed therein. It is possible to form a film having a surface resistivity not lower than $10^6$ ohms/square if fine particles can be isolated so as not to form contact conduction paths. This is possible by adjusting the amount of the binder. The surface resistivity of a film can also be controlled if a coupling agent, or dispersant is caused to act upon the surfaces of fine particles to keep the particles away from contact with one another.

The film of this invention is formed by fine particles deposited with a high density on a base. Upon hardening of the solution which has been applied to the base, the binder unites the fine particles with the base, and enables a film of improved hardness to be formed. A hard coat layer may be formed thereon to improve the adhesion of the film to the base and the hardness and weatherability of the film to a further extent.

The coating solution may contain fine particles of $SiO_2$, $TiO_2$, $ZrO_2$, $Al_2O_3$ or MgO to form a film of improved hardness and wear resistance., These particles are basically transparent and do not lower the transmittance of visible light by a film.

Any method can be employed for applying the solution if it can form an even, thin and uniform film. For example, it is possible to employ dipping, flow-, spray-, bar-, spin-, gravure-, roll-, or blade- coating, or screen printing.

If the solution contains a resin as the binder, it is curable by following one at the known specific methods. If it is of the ultraviolet-curing type, it is possible to employ an ultraviolet lamp selected in accordance with the resonant wavelength of the photoinitiator and the intended rate of curing . Typical lamps include a low-, high- or ultrahigh-pressure mercury lamp, a metal halide lamp, a pulse xenon lamp and an electrodeless discharge lamp. An electron beam-curing resin, with which no photoinitiator is used, is curable by employing a scanning-type, electron curtain-type, or other type of apparatus for emitting electron beams. A heat-curing resin is curable by heating to an appropriate temperature, while a cold-curing one may be left to stand at an ambient temperature to cure.

The film of this invention does not substantially reflect visible light and present a shiny surface, as opposed to any oxide film formed by a known physical coating process, packed densely with crystals and having a mirror-like surface. If it is desirable to restrain its reflection of visible light to any further extent, its visible reflectivity can easily be lowered by forming thereon a film of e.g. $SiO_2$ or MgF having a low refractive index.

The film of this invention, which is essentially formed from inorganic materials including hexaboride, ITO and ATO, is superior in weatherability to any film of organic materials, and its exposure to sunlight does not bring about any appreciable discoloration, or degradation in properties.

The invention will now be described in further detail based on Examples embodying it and Comparative Examples.

EXAMPLE 1

A dispersion of fine particles of $LaB_6$ (Dispersion A) was prepared by mixing 20 g of fine particles of $LaB_6$ having an average diameter of 90 nm, 73 g of isobutyl alcohol (IBA) and 7 g of a coupling agent for dispersing fine particles (a silicone coupling agent supplied by Toshiba Silicone Co.) for 200 hours in a ball mill containing zirconia balls having a diameter of 2 mm. An ultraviolet-curing resin supplied by Shinetsu Chemical Co. and having a solid content of 80% was adopted as a binder (Dispersion B). A dispersion of fine particles of ITO (Dispersion C) was prepared by mixing 30 g of fine particles of ITO having an average diameter of 70 nm, 56g of isobutyl alcohol (IBA) and 14 g of a coupling agent for dispersing fine particles (a silicone coupling agent supplied by Adeka Co.) for 180 hours in a ball mill containing zirconia balls having a diameter of 1 mm.

Dispersions A, B and C were diluted with ethanol, and mixed thoroughly in the proportions shown in Table 1 below to prepare a coating solution. The solution was applied onto the easy-to-adhere surface of a PET film (product of Teijin known as EPE-50 and having a thickness of 50 microns) by a No. 16 bar coater to form a film thereon. It was heated for about two minutes in a dryer having a temperature of 130° C. to allow the solvent to evaporate, and was thereafter cured by one minute of exposure to ultraviolet radiation from a high-pressure mercury lamp to give an intended film.

Figure 1:
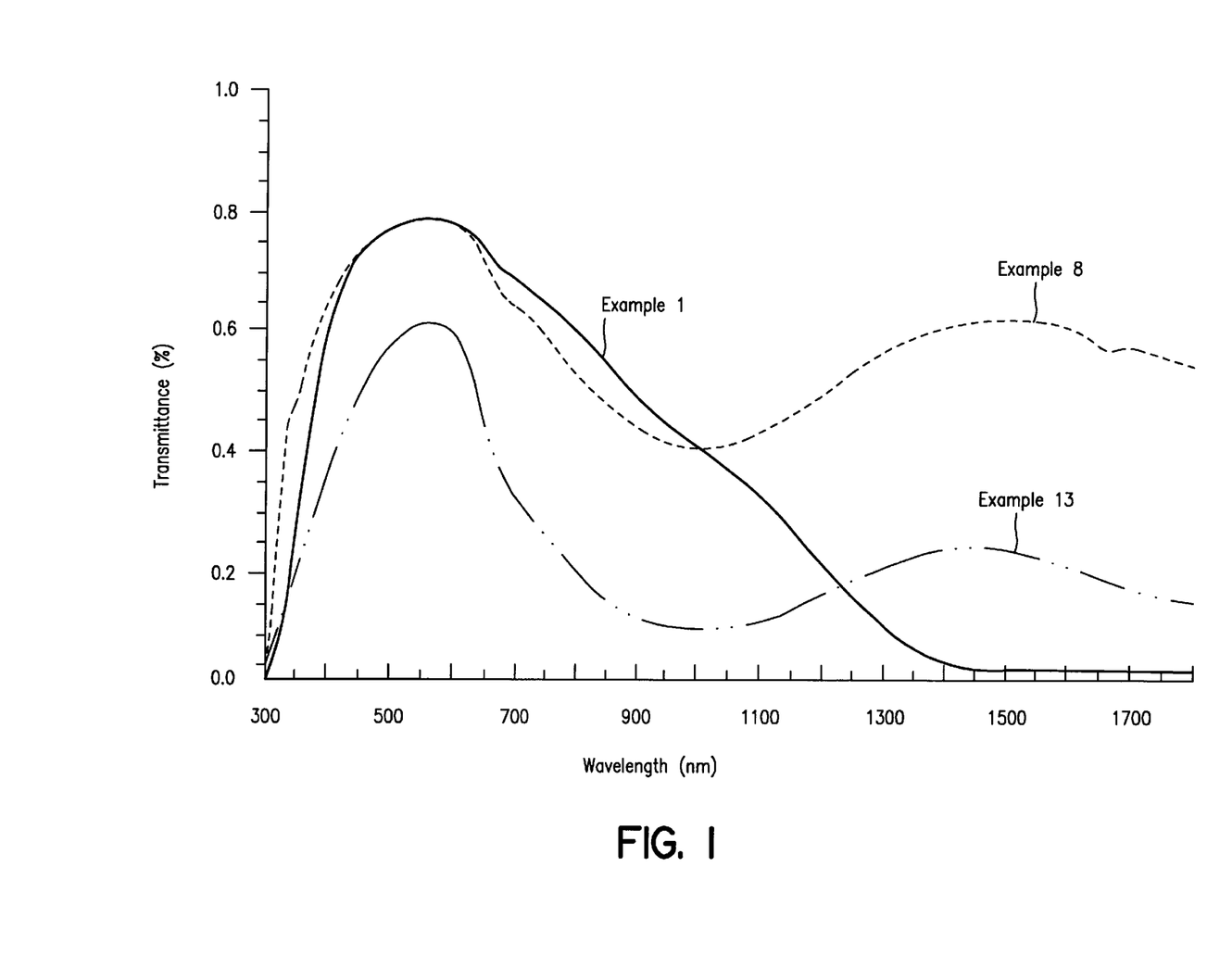
FIG. 1. is a graph showing the transmittance of light through the films embodying this invention which will be described as Examples 1, 8 and 13.

The film was examined for its solar transmittance and visible light transmittance by employing a spectrophotometer of Hitachi Limited for wavelengths of 200 to 1800 nm and conducting calculations in accordance with the JIS R3106 method. Its surface resistivity was measured by employing an instrument supplied by Mitsubishi Yuka Co. The results are all shown in Table 1. Table 1 also shows the results as obtained from the films according to Examples 2 to 23 and Comparative Examples 1 to 3. FIG. 1 shows the results of examination for transmittances as obtained from some of the films.

EXAMPLES 2 TO 5

Dispersions A, B, and C were diluted with ethanol and mixed thoroughly in the proportions shown in Table 1 to prepare coating solutions. Example 1 was followed for preparing coating solutions, forming a film from each solution and examining it for various properties. The results are shown in Table 1.

COMPARATIVE EXAMPLE 1

A coating solution was prepared by diluting Dispersions B and C with diacetone alcohol (DAA), and mixing them thoroughly in the proportions shown in Table 1. Example 1 was thereafter followed for forming a film and examining its properties. The results are shown in Table 1.

Figure 2:
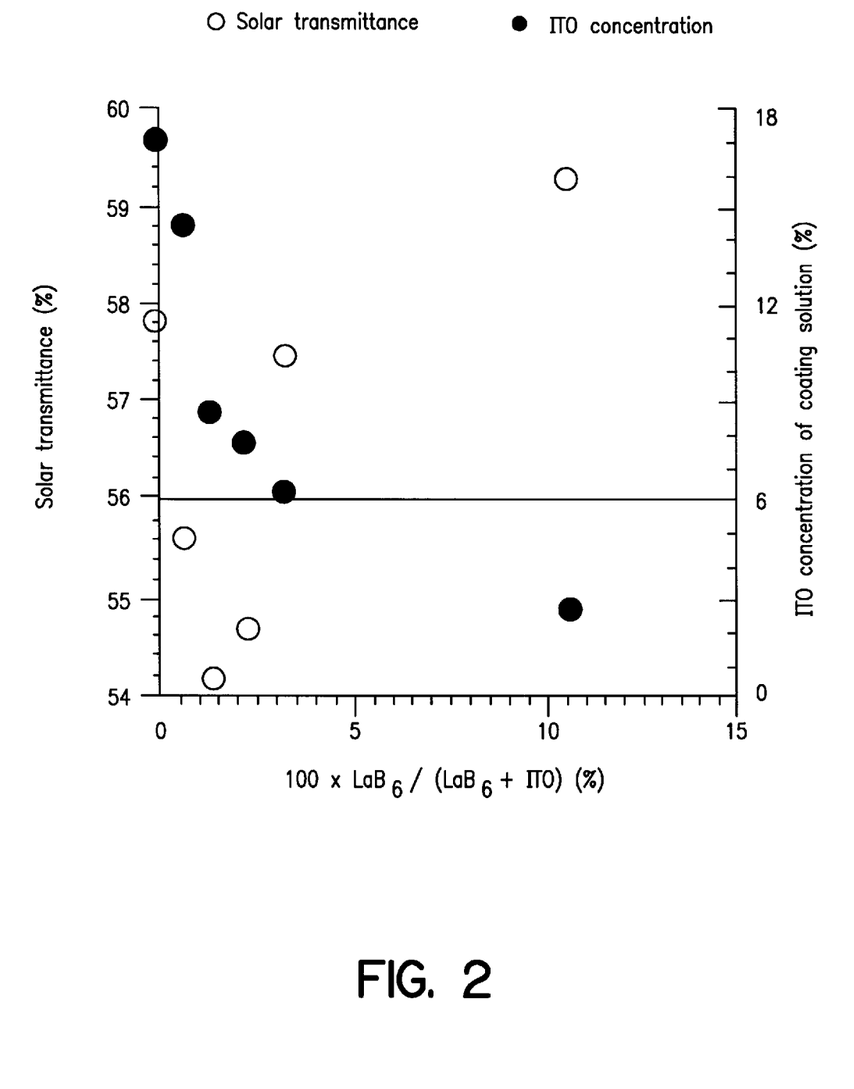
FIG. 2 is a graph showing the solar transmittances (%) through films formed by solutions containing fine particles of $LaB_6$ and ITO, and having a visible light transmittance of 78%, and the ITO concentration (%) of the solutions in relation to the percentages by weight of the $LaB_6$ particles in the total amount of the particles.

FIG. 2 compares the compositions employed for the films according to Examples 1 to 5 and Comparative Example 1 and their optical properties. As is obvious from FIG. 2, the use of a small amount of $LaB_6$ made it possible to form a film having a low solar transmittance, i.e., a low transmittance of heat radiation, while retaining a high transmittance of visible light, as compared with the known ITO film, while achieving a great reduction in the amount of ITO. The difference is more obvious from a comparison of Example 2 and Comparative Example 1. The film of Example 2 containing about 1.37% by weight of $LaB_6$ [$0.12/(0.12+8.66) \times 100$ (%)] showed a more than 3% lower solar transmittance, while maintaining the same visible light transmittance of 78%, and its ITO content was reduced to close to half (8.66/17.0). These results show that the addition of a small amount of $LaB_6$ makes it possible to form a film having an improved ability to cut off solar heat radiation at a lower cost.

COMPARATIVE EXAMPLE 2

A dispersion of fine particles of ATO (Dispersion D) was prepared by mixing 30 g of fine particles of ATO having San average diameter of 50 nm, 55 g of isobutyl alcohol (IBA) and 15 g of a coupling agent for dispersing fine particles (a silicone coupling agent supplied by Adeka Co.) for 150 hours in a ball mill containing zirconia balls having a diameter of 1 mm.

Dispersions B and D were diluted with DAA, and mixed thoroughly in the proportions shown in Table 1 to prepare a coating solution. Example 1 was followed for forming a film and examining its properties. The results are shown in Table 1.

EXAMPLE 6 TO 9

Coating solutions were prepared by diluting Dispersions A, B and D with isobutyl alcohol and mixing them thoroughly in the proportions shown in Table 1. Comparative Example 1 was followed for forming a film from each solution and examining its properties. The results are shown in Table 1. The optical properties of the film according to Example 8 are also shown in FIG. 1.

Figure 3:
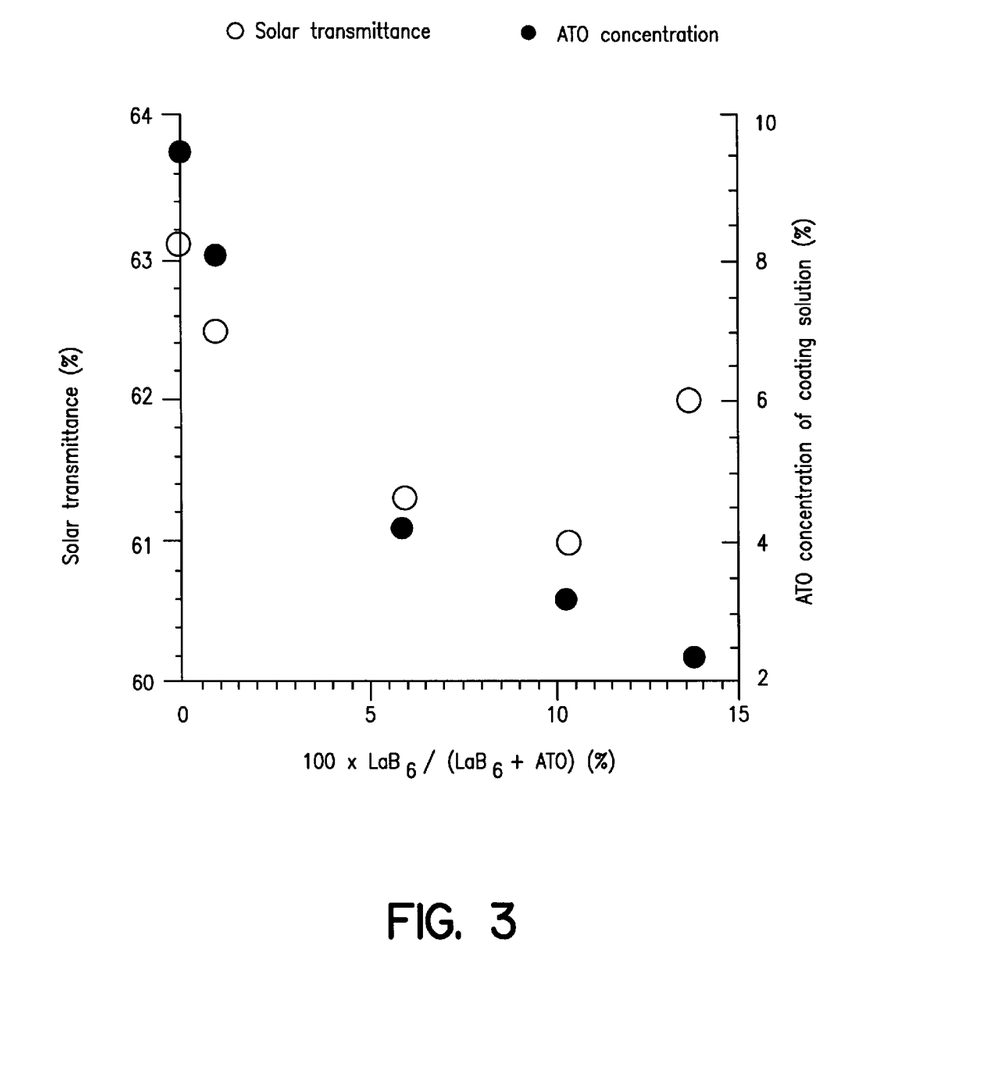
FIG. 3 is a graph showing the solar transmittances (%) through films formed by solutions containing fine particles of $LaB_6$ and ATO, and having a visible light transmittance of 78%, and the ATO concentration (%) of the solutions in relation to the percentages by weight of the $LaB_6$ particles in the total amount of the particles.

FIG. 3 compares the compositions employed for the films according to Comparative Example 2 and Examples 6 to 9 and their optical properties. As is obvious from FIG. 3, the use of a small amount of $LaB_6$ made it possible to form a film having a low solar transmittance, while retaining a high transmittance of visible light, as compared with the known ATO film, while achieving a great reduction in the amount of ATO. The difference is more obvious from a comparison of Example 8 and Comparative Example 2. The film of Example 8 containing about 10.5% by weight of $LaB_6$ [$0.37/(0.37+3.16) \times 100$ (%)] showed an about 2% lower transmittance, while maintaining the same visible light transmittance of 78%, and its ATO content was reduced to about one-third (3.16/9.5).

COMPARATIVE EXAMPLE 3

A coating solution was prepared by diluting Dispersions A, B and D with DAA and mixing them thoroughly in the proportions shown in Table 1. Example 1 was followed for forming a film and examining its properties. The results are shown in Table 1.

EXAMPLE 10

A cold-curing resin (a hybrid cold-curing resin/curing catalyst as supplied by JAR) was adopted as a binder (Dispersion E). A coating solution was prepared by diluting Dispersions A, D and E with DAA and mixing them thoroughly in the proportions shown in Table 1. A film was formed by repeating Example 1, and was left at room temperature for about one day to cure and form the intended film. Example 1 was followed for examining its properties. The results are shown in Table 1.

EXAMPLES 11 TO 15

Coating solutions were prepared by diluting Dispersions A, B and D with DAA and mixing them thoroughly in the proportions shown in Table 1. Example 1 was followed for forming a film from each solution and examining its properties. The results are shown in Table 1. The optical properties of the film according to Example 13 are also shown in FIG. 1.

Figure 4:
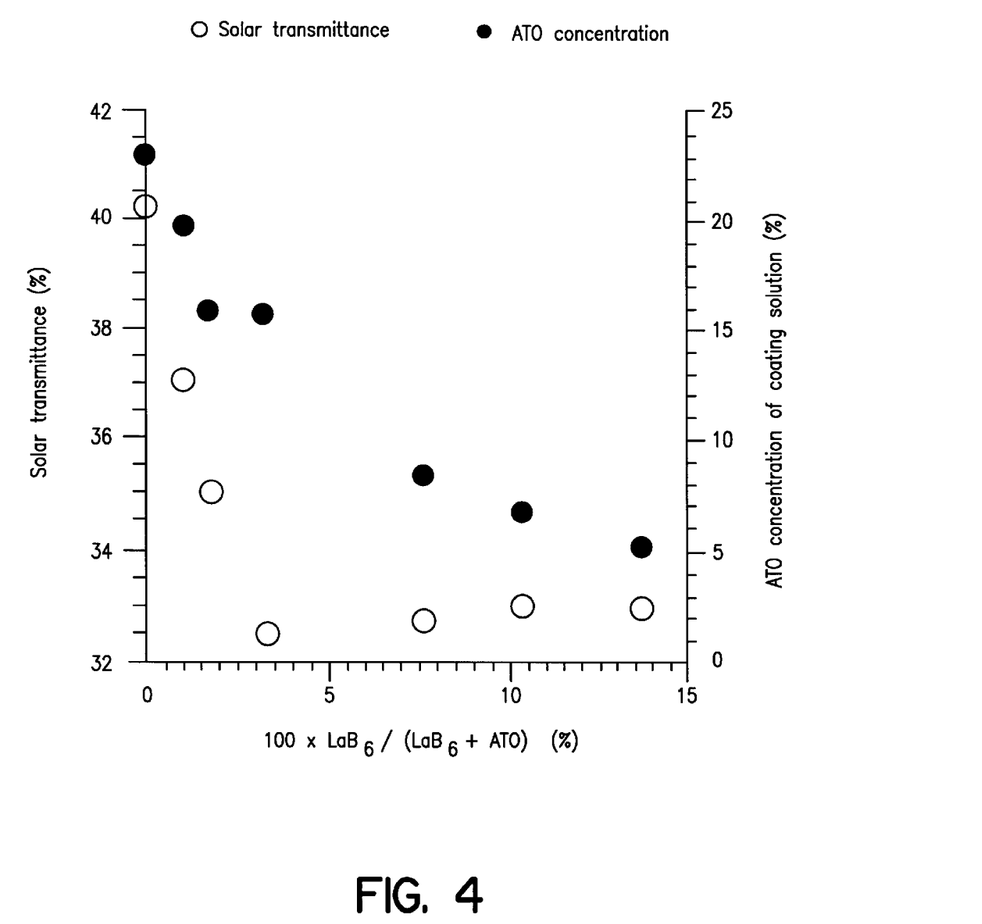
FIG. 4 is a graph showing the solar transmittances (%) through films formed by solutions containing fine particles of $LaB_6$ and ATO, and having a visible light transmittance of 60%, and the ATO concentration (%) of the solutions in relation to the percentages by weight of the $LaB_6$ particles in the total amount of the particles.

FIG. 4 compares the compositions employed for the films according to Comparative Example 3 and Examples 10 to 15 and their optical properties. As is obvious from FIG. 4, the use of a small amount of $LaB_6$ made it possible to form a film having a low solar transmittance, while retaining a high transmittance of visible light, as compared with the known ATO film, while achieving a great reduction in the amount of ATO. The difference is more obvious from a comparison of Example 13 and Comparative Example 3. Both of the films according to ale 13 and Comparative Example 3 showed a visible light transmittance of 60%, but while the film of Comparative Example 3 not containing $LaB_6$ was formed from the solution containing as much as 23% by weight of ATO, the film of Example 13 containing 7.7% by weight of $LaB_6$ was formed from the solution containing only 8.28% by weight of ATO, or less than a half of 23.0% in the case of Comparative Example 3, and showed a more than 7% lower solar transmittance. It is, thus, obvious that the addition of $LaB_6$ makes it possible to form a film having an improved property of cutting off solar heat radiation at a lower cost.

A coating solution was prepared by diluting Dispersions A, B and C with DAA and mixing them thoroughly in the proportions shown in Table 1. Example 1 was followed for forming a film and examining its properties. The results are shown in Table 1. It is obvious from the results of Example 16 that the use of a very small amount of $LaB_6$ and a small amount of ITO in combination makes it possible to form a film which can cut off heat radiation effectively, while having a relatively low transmittance of 60% for visible light. ITO is so expensive that a film not containing $LaB_6$, but showing a visible light transmittance of 60% is very expensive, but the film of Example 16 containing $LaB_6$ showed good ability to cut off heat radiation despite its low ITO content, as is obvious from its comparison with Comparative Example 1. It is also obvious from Example 16 that according to this invention, it is easy to form a film having a different transmittance of visible light, i.e. providing a different degree of brightness as required for ensuring, for example, the protection of privacy.

EXAMPLE 17

A dispersion of fine particles of $CeB_6$ (Dispersion F) was prepared by mixing 20 g of fine particles of $CeB_6$ having an average diameter of 85 nm, 73 g of isobutyl alcohol (IBA) and 7 g of a coupling agent for dispersing fine particles (a silicone coupling agent supplied by Toshiba Silicone Co.) for 200 hours in a ball mill containing zirconia balls having a diameter of 2 mm.

A coating solution was prepared by diluting Dispersions B, C and F with DAA and mixing them thoroughly in the proportions shown in Table 1. Example 1 was followed for forming a film and examining its properties. The results are shown in Table 1.

EXAMPLE 18

A dispersion of fine particles of $PrB_6$ (Dispersion G) was prepared by mixing 20 g of fine particles of $PrB_6$ having an average diameter of 85 nm, 73 g of isobutyl alcohol (IBA) and 7 g of a coupling agent for dispersing fine particles (a silicone coupling agent supplied by Toshiba Silicone Co.) for 200 hours in a ball mill containing zirconia balls having a diameter of 2 mm.

A coating solution was prepared by diluting Dispersions B. C and G with DAA and mixing them thoroughly in the proportions shown in Table 1. Example 1 was followed for forming a film and examining its properties. The results are shown in Table 1.

EXAMPLE 19

A dispersion of fine particles of $NdB_6$ (Dispersion H) was prepared by mixing 20 g of fine particles of $NdB_6$ having an average diameter of 85 nm, 73 g of isobutyl alcohol (IBA) and 7 g of a coupling agent for dispersing fine particles (a silicone coupling agent supplied by Toshiba Silicone Co.) for 200 hours in a ball mill containing zirconia balls having a diameter of 2 mm.

A coating solution was prepared by diluting Dispersions B, D and H with DAA and mixing them thoroughly in the proportions shown in Table 1. Example 1 was followed for forming a film and examining its properties. The results are shown in Table 1.

EXAMPLE 20

A dispersion of fine particles of $GdB_6$ (Dispersion I) was prepared by mixing 20 g of fine particles of $GdB_6$ having an average diameter of 85 nm, 73 g of isopropyl alcohol (IPA) and 7 g of a coupling agent for dispersing fine particles (a silicone coupling agent supplied by Toshiba Silicone Co.) for 200 hours in a ball mill containing zirconia balls having a diameter of 2 mm.

A coating solution was prepared by diluting Dispersions B, D and I with DAA and mixing them thoroughly in the proportions shown in Table 1. Example 1 was followed for forming a film and examining its properties. The results are shown in Table 1.

A dispersion of fine particles of $YB_6$ (Dispersion J) was prepared by mixing 20 g of fine particles of $YB_6$ having an average diameter of 85 nm, 73 g of isopropyl alcohol (IPA) and 7 g of a coupling agent for dispersing fine particles (a silicone coupling agent supplied by Toshiba Silicone Co.) for 200 hours in a ball mill containing zirconia balls having a diameter of 2 mm.

A coating solution was prepared by diluting Dispersions B, C and J with DAA and mixing them thoroughly in the proportions shown in Table 1. Example 1 was followed for forming a film and examining its properties. The results are shown in Table 1.

EXAMPLE 22

A dispersion of fine particles of $SmB_6$ (Dispersion K) was prepared by mixing 20 g of fine particles of $SmB_6$ having an average diameter of 85 nm, 73 g of isopropyl alcohol (IPA) and 7 g of a coupling agent for dispersing fine particles (a silicone coupling agent supplied by Toshiba Silicone Co.) for 200 hours in a ball mill containing zirconia balls having a diameter of 2 mm.

A coating solution was prepared by diluting Dispersions B, D and K with DAA and mixing them thoroughly in the proportions shown in Table 1. Example 1 was followed for forming a film and examining its properties. The results are shown in Table 1.

A dispersion of fine particles of $EuB_6$ (Dispersion L) was prepared by mixing 20 g of fine particles of $EuB_6$ having an average diameter of 85 nm, 73 g of diacetone alcohol (DAA) and 7 g of a coupling agent for dispersing fine particles (a silicone coupling agent supplied by Toshiba Silicone Co.) for 200 hours in a ball mill containing zirconia balls having a diameter of 2 nm.

A coating solution was prepared by diluting Dispersions B, D and L with DAA and mixing them thoroughly in the proportions shown in Table 1. Example 1 was followed for forming a film and examining its properties. The results are shown in Table 1.

TABLE 1

| | Composition of coating solution (wt. %) | | | | | Optical properties of film | | Electrical properties |
|---|---|---|---|---|---|---|---|---|
| | Hexaboride | | ITO | ATO | Binder | | Visible light | Solar | Surface |
| | Kind | Concentration | Concentration | Concentration | Type | Concentration | transmittance (%) | transmittance (%) | resistivity (Ω/suqare) |
| Example 1 | $LaB_6$ | 0.09 | 14.5 | 0 | Ultraviolet curing | 20 | 78 | 55.6 | $>1 \times 10^6$ |
| Example 2 | $LaB_6$ | 0.12 | 8.66 | 0 | Ultraviolet curing | 20 | 78 | 54.2 | $>1 \times 10^6$ |

TABLE 1-continued

| | Composition of coating solution (wt. %) | | | | | Optical properties of film | | Electrical properties |
| | Hexaboride | | ITO | ATO | Binder | | Visible light | Solar | Surface |
| | Kind | Concentration | Concentration | Concentration | Type | Concentration | transmittance (%) | transmittance (%) | resistivity ($\Omega$/suqare) |
|---|---|---|---|---|---|---|---|---|---|
| Example 3 | LaB$_6$ | 0.18 | 7.68 | 0 | Ultraviolet curing | 20 | 78 | 54.7 | >1 × 10$^6$ |
| Example 4 | LaB$_6$ | 0.21 | 6.18 | 0 | Ultraviolet curing | 20 | 78 | 57.5 | >1 × 10$^6$ |
| Example 5 | LaB$_6$ | 0.33 | 2.75 | 0 | Ultraviolet curing | 20 | 78 | 59.3 | >1 × 10$^6$ |
| Comparative Example 1 | LaB$_6$ | 0 | 17.0 | 0 | Ultraviolet curing | 20 | 78 | 57.8 | >1 × 10$^6$ |
| Comparative Example 2 | LaB$_6$ | 0 | 0 | 9.5 | Ultraviolet curing | 20 | 78 | 63.1 | >1 × 10$^6$ |
| Example 6 | LaB$_6$ | 0.09 | 0 | 8.06 | Ultraviolet curing | 20 | 78 | 62.5 | >1 × 10$^6$ |
| Example 7 | LaB$_6$ | 0.27 | 0 | 4.15 | Ultraviolet curing | 20 | 78 | 61.3 | >1 × 10$^6$ |
| Example 8 | LaB$_6$ | 0.37 | 0 | 3.16 | Ultraviolet curing | 20 | 78 | 61.0 | >1 × 10$^6$ |
| Example 9 | LaB$_6$ | 0.38 | 0 | 2.38 | Ultraviolet curing | 20 | 78 | 62.0 | >1 × 10$^6$ |
| Comparative Example 3 | LaB$_6$ | 0 | 0 | 23.0 | Ultraviolet curing | 30 | 60 | 40.2 | >1 × 10$^6$ |
| Example 10 | LaB$_6$ | 0.22 | 0 | 19.7 | Cold curing | 25 | 60 | 37.0 | >1 × 10$^6$ |
| Example 11 | LaB$_6$ | 0.29 | 0 | 15.7 | Ultraviolet curing | 30 | 60 | 35.0 | >1 × 10$^6$ |
| Example 12 | LaB$_6$ | 0.52 | 0 | 15.5 | Ultraviolet curing | 30 | 60 | 32.5 | >1 × 10$^6$ |
| Example 13 | LaB$_6$ | 0.69 | 0 | 8.28 | Ultraviolet curing | 30 | 60 | 32.7 | >1 × 10$^6$ |
| Example 14 | LaB$_6$ | 0.77 | 0 | 6.66 | Ultraviolet curing | 30 | 60 | 33.0 | >1 × 10$^6$ |
| Example 15 | LaB$_6$ | 0.84 | 0 | 5.24 | Ultraviolet curing | 30 | 60 | 33.0 | >1 × 10$^6$ |
| Example 16 | LaB$_6$ | 0.82 | 6.94 | 0 | Ultraviolet curing | 30 | 60 | 31.0 | >1 × 10$^6$ |
| Example 17 | CeB$_6$ | 0.19 | 7.70 | 0 | Ultraviolet curing | 20 | 77 | 53.8 | >1 × 10$^6$ |
| Example 18 | PrB$_6$ | 0.20 | 7.50 | 0 | Ultraviolet curing | 20 | 77 | 54.1 | >1 × 10$^6$ |
| Example 19 | NdB$_6$ | 0.51 | 0 | 14.5 | Ultraviolet curing | 33 | 59 | 33.0 | >1 × 10$^6$ |
| Example 20 | GbB$_6$ | 0.60 | 0 | 12.3 | Ultraviolet curing | 34 | 60 | 34.5 | >1 × 10$^6$ |
| Example 21 | YB$_6$ | 0.17 | 7.0 | 0 | Ultraviolet curing | 20 | 78 | 54.0 | >1 × 10$^6$ |
| Example 22 | SmB$_6$ | 0.80 | 0 | 6.51 | Ultraviolet curing | 33 | 60 | 34.1 | >1 × 10$^6$ |
| Example 23 | EuB$_6$ | 0.82 | 0 | 6.50 | Ultraviolet curing | 33 | 60 | 34.3 | >1 × 10$^6$ |

What is claimed is:

1. A uniformly dispersed coating solution for forming a film for cutting off heat radiation which contains fine particles of at least one hexaboride and fine particles of tin-containing indium oxide (ITO) or antimony-containing tin oxide (ATO) in a weight ratio of from 0.1:99.0 to 15:85, said hexaboride being represented as XB$_6$ where X is Y, LA, Ce, PR, Nd, Sm, Eu, Gd, Tb, Dy, Ho, Er, Tm, Yb, Lu, Sr or Ca and wherein said fine particles of hexaboride, ITO and ATO have a diameter of up to 200 nm.

2. A solution as set forth in claim 1, further containing fine particles of at least one oxide selected from the group consisting of SiO$_2$, TiO$_2$, ZrO$_2$, Al$_2$O$_3$ and MgO, said fine particles of at least one oxide having diameters of up to 200 nm.

3. A solution as set forth in claim 1, including a binder of at least one resin selected from the group consisting of ultraviolet-curing, electron beam-curing, cold-curing and thermoplastic resins.

4. A solution as set forth in claim 2, wherein said particles of at least one oxide are in a colloidal state.

5. A film for cutting off solar radiation which is formed by coating at least one side of a base with a uniformly dispersed solution containing fine particles of at least one hexaboride and fine particles of tin-containing indium oxide (ITO) or antimony-containing tin oxide (ATO) in a weight ratio of from 0.1:99.0 to 15:85, said hexaboride being represented as XB$_6$ where X is Y, LA, Ce, PR, Nd, Sm, Eu, Gd, Tb, Dy, Ho, Er, Tm, Yb, Lu, Sr or Ca, said fine particles of at least one hexaboride and said fine particles of ITO or ATO having a diameter of up to 200 nm.

6. A film as set forth in claim 5, wherein said base is a film of a resin selected from the group consisting of polycarbonate, polyacrylic, polymethacrylic, saturated polyester and cyclic olefin resins.

7. A film as set forth in claim 6, including an adhesive layer and a release film on one side of said resin film.

8. A film as set forth in claim 5, including a hard coat layer on at least one side of said base as an outermost layer.

9. A film as set forth in claim 8, wherein said hard coat layer is formed by a solution containing an ultraviolet-curing resin as a binder.

10. A film as set forth in claim 9, wherein said solution for said hard coat layer further contains fine particles of at least one oxide selected from the group consisting of $SiO_2$, $TiO_2$, $ZrO_2$, $Al_2O_3$ and MgO.

11. A film as set forth in claim 9, wherein said ultraviolet-curing resin has its principal constituent combined chemically with at least one inorganic oxide selected from the group consisting of $SiO_2$, $TiO_2$, $ZrO_2$, $Al_2O_3$ and MgO.

12. A film as set forth in claim 5, wherein said film has a surface resistivity of at least $10^6$ ohms/square.

* * * * *